No. 879,661. PATENTED FEB. 18, 1908.
J. MOREAU.
POTATO DIGGER.
APPLICATION FILED MAY 13, 1907.
3 SHEETS—SHEET 1.
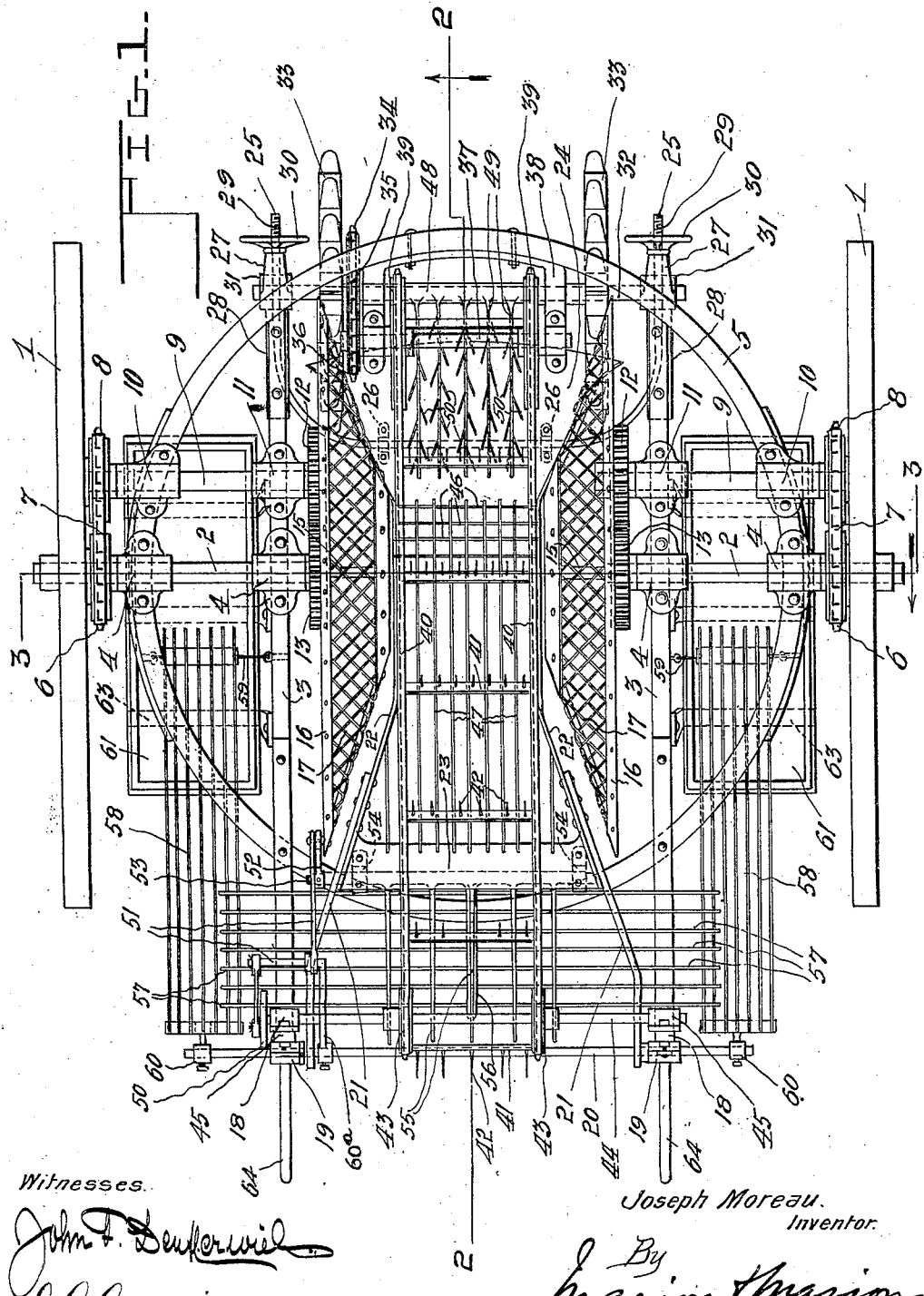
Witnesses.
Joseph Moreau.
Inventor.
By
Attorneys.

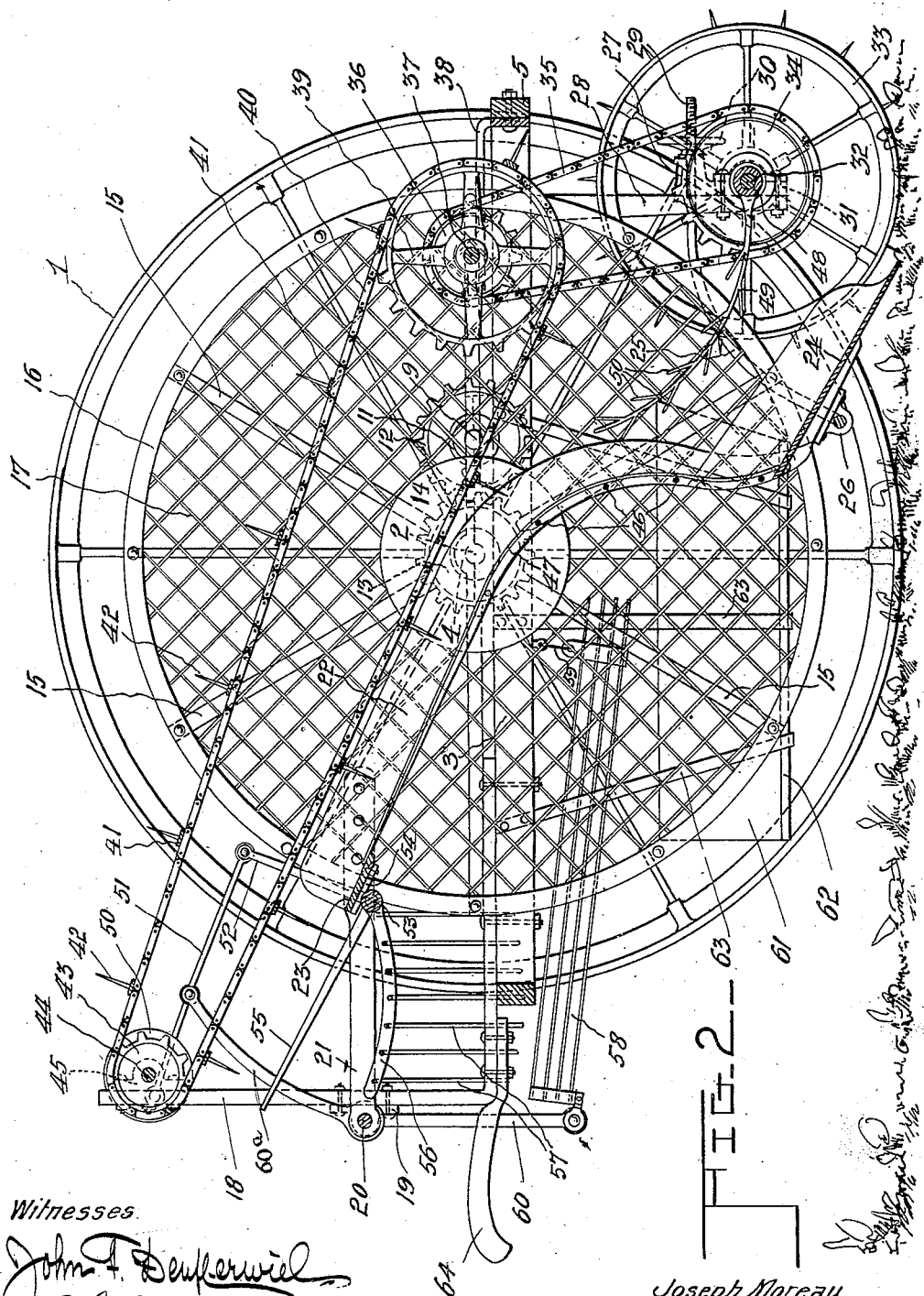

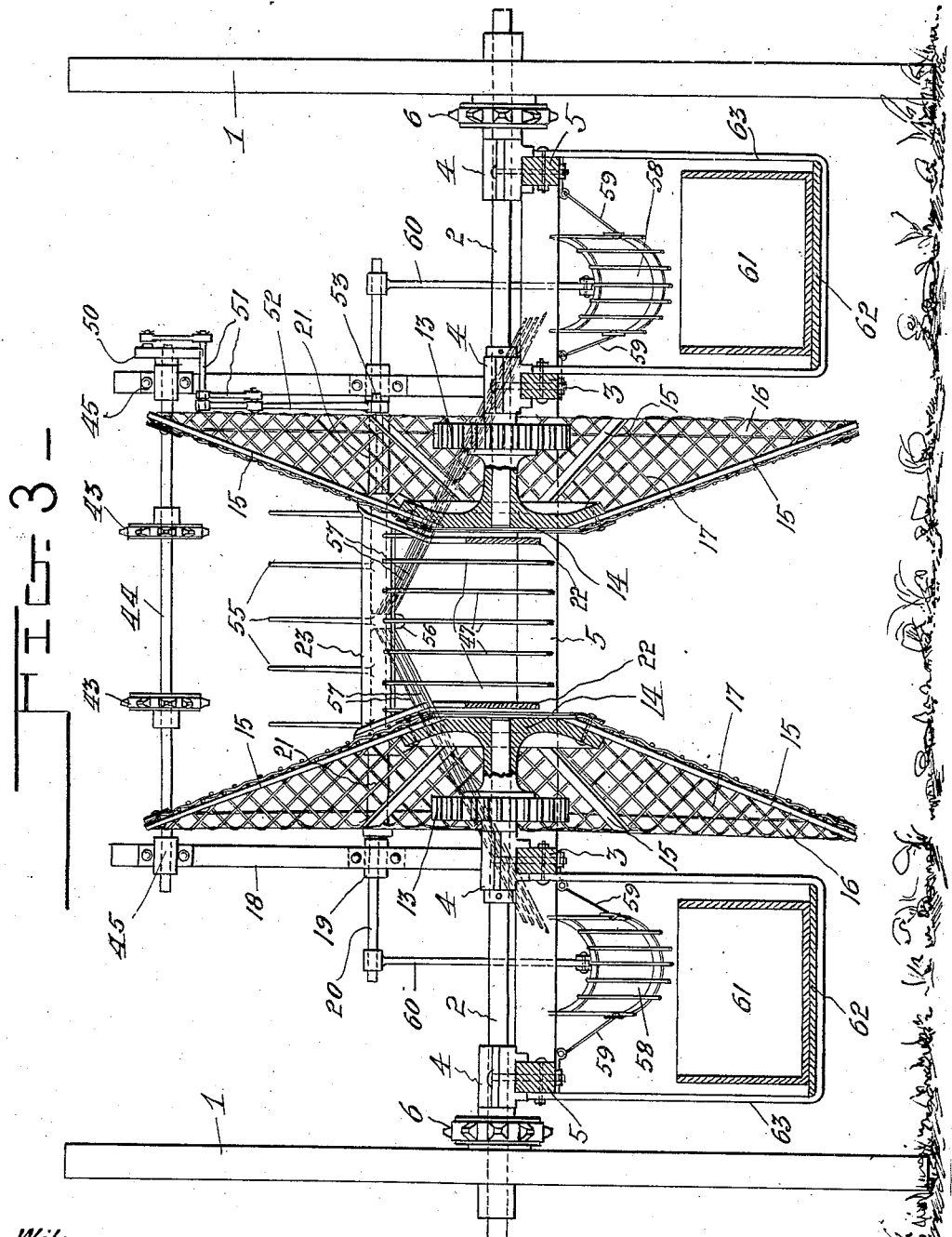

UNITED STATES PATENT OFFICE.

JOSEPH MOREAU, OF ST. GERMAIN DE GRANTHAM, QUEBEC, CANADA.

POTATO-DIGGER.

No. 879,661.　　　　Specification of Letters Patent.　　　　Patented Feb. 18, 1908.

Application filed May 13, 1907. Serial No. 373,373.

*To all whom it may concern:*

Be it known that I, JOSEPH MOREAU, a subject of the King of Great Britain, residing at St. Germain de Grantham, county of Drummond, in the Province of Quebec, Canada, have invented certain new and useful Improvements in Potato-Diggers; and I do hereby declare that the following is a full, clear, and exact description of the invention, such as will enable others skilled in the art to which it appertains to make and use the same.

My invention relates to potato diggers; the object of my invention is to provide means in combination with a digging member for subjecting the potatoes and soil to a rotary movement, which tends to separate and carry them towards the rear part of the implement; a further object is to provide novel means for elevating the digging members to an inoperative position; a further object is to thoroughly separate the vines from the potatoes and to deposit them at the rear of the implement; and, my invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a plan view; Fig. 2 is a longitudinal vertical section, taken approximately on line 2—2 of Fig. 1, looking in the direction indicated by the arrow; and, Fig. 3 is a transverse vertical section, taken approximately on line 3—3 of Fig. 1, looking in the direction indicated by the arrow.

Referring to the drawings, 1, 1 designate supporting wheels loosely mounted on the outer ends of stub shafts 2, 2. Disposed transversely of the stub shafts 2, 2, and longitudinally of the implement, are beams 3, 3, on which are secured bearings 4, in which bearings are fixed the shafts 2. Secured to the beams 3, and the bearings 4, is an annular frame 5. The beams 3, the annular frame 5, the stub shafts 2, and the wheels 1, form a wheeled supporting frame, hereinafter referred to as a whole by that term.

Secured to the wheels 1, on the inner sides thereof, are sprocket wheels 6, over which are run the chains 7, which chains pass over sprocket wheels 8 secured on shafts 9, which shafts 9 are carried in bearings 11 and 10, respectively, disposed on the beams 3 and the frame 5. Secured on the inner ends of the shafts 9 are gears 12, disposed in mesh with gears 13, loosely mounted on the inner ends of the stub shafts 2, and formed integral with the hubs 14. Radiating from the hubs 14 are spokes 15, the outer ends of which are secured to the rims 16. The spokes 15 are covered by a foraminated material 17, and the spokes are inclined outwardly from the hubs 14. There being two of the wheels formed by the hubs 14, spokes and rims 16, the dug potatoes and soil being passed between the wheels, have a tendency to be thrown towards the center of the implement. By means of the two shafts, the gears and the sprocket wheels and chains, the direction of rotation of the separating wheels will be towards the rear of the implement when the implement is advanced forward, so that the dug soil and potatoes will be conveyed towards the rear end of the implement.

Carried by the beams 3 are upwardly projecting standards 18, disposed at the rear end of the implement. Carried by the standards 18 are bearings 19, in which is disposed a transverse supporting shaft 20. Disposed with one end on the shaft 20, are arms 21, which arms project forward and are secured to the side members 22 of a conveying chute, which side members are secured together at their rear and upper ends by the transverse table 23, and have their forward and lower ends connected by a digging member 24. A yoke-shaped member 25 is rockably maintained beneath the digging member 24 in the bearing 26, and has its forward ends projecting through blocks 27, which blocks are carried by hangers 28 supported from the beams 3. The forward ends of the yoke 25 are provided with screw-threads 29, and have disposed thereon interiorly screw-threaded hand wheels 30, which bear against the forward faces of the blocks 27. By actuating the hand-wheels on the screw-threaded ends 29 of the yoke 25, the digging member may be elevated until it is free from the soil, and the implement transported from place to place without performing the digging operation, the digging member and its supporting sides 22 being suspended from the transverse shaft 20, and only supported at the bottom by the yoke 25.

Carried by the hangers 28, are bearings 31, in which is disposed a shaft 32. Secured to the ends of the shaft are supporting wheels 33. Secured on the shaft 32 is a sprocket wheel 34, over which is run a chain 35, passing over a sprocket wheel 36, which latter sprocket wheel is secured on a shaft 37 carried in a bearing yoke 38 secured to the annular frame member 5.

Secured on the shaft 37 is a pair of sprocket wheels 39, over which are run the conveyer chains 40, connected by the transverse strips 41, having spurs 42 thereon. The chains 40 are run over sprocket wheels 43, which are supported on a transverse shaft 44, carried in bearings 45 secured to the standards 18.

Connecting the side members 22, intermediate of their ends, are cross pieces 46, and extending from the cross pieces 46 to the table 23 are longitudinal slats 47, which are inclined upwardly and follow the contour of the side members 22.

For the purpose of partly separating the dug soil and potatoes, a sleeve 48 is loosely mounted on the shaft 32, and is provided with the arms 49, having the fingers 50, which arms extend over the digging member 24 and extend slightly upward between the lower ends of the side members 22.

Secured on the shaft 44 is a disk 50, to which is connected an eccentric rod 51, the forward end of which rod is pivoted to an arm 52, secured on a transverse shaft 53, which shaft is rockably disposed in bearings 54 on the arms 21. Secured on the shaft 53 are upwardly projecting separating fingers 55, and also secured on the shaft 53 is an arm 56, which arm may be made integral with the separating fingers 55.

Disposed transversely through the arm 56, are rods 57, which are oppositely inclined downward from the arm 56, and have their outer ends terminating above the longitudinal separating grills 58. The forward ends of the grills 58 are inclined downward and forward, and are rockably supported by the links 59. The rear upper ends of the grills 58 are supported by the lower ends of rods 60, which are secured on the shaft 20. A rocking arm 60ª is secured to the shaft 20 and has its upper end pivoted to one of the eccentric rods 51. Rotation of the shaft 44 causes rotation of the disk 50, and the reciprocation of the rods 51. Through the medium of the arm 52, the shaft 53 is rocked, causing a rocking movement of the separating fingers 55 and the arm 56 and its connected parts. Through the medium of the rods 60, the grills 58 are given a reciprocating movement, so that the potatoes are gradually shaken downward and finally dropped into the receptacles 61, carried on platforms 62, which are supported by the straps 63 which are carried by the beams 3 and the annular frame 5.

In the operation of the implement, it being actuated forward, the digging implement 24 enters the soil beneath the potatoes to be dug, and the forward movement of the implement forces the soil upward on the digging member between the side members 22 to the cross pieces 46 and longitudinal strips 47. The arms 49 tend to break the clods and at the same time prevent the vines and potatoes from falling back. At a point above the ends of the arms 49, the vines and potatoes are caught by the spurs 42, and are conveyed back across the table 23 and fall on the rods 57. The fingers 55 being located between 57, the upper ends of the side members 22 and the rods 57, the vines are caught on the fingers 55 and are carried further back, and finally dropped behind the implement. The potatoes and adhering soil drop from the rods 57 to the grills 58, and the agitating movement described for the grills shakes the potatoes down to the receptacles 61.

By means of the screw-threaded adjustment of the front end of the yoke 25, the digging member 24 may be set for any particular depth, or may be raised to an inoperative position for the purpose of transporting the implement from place to place. When it is desired to turn the implement, by pressing on the handles 64, the front wheels 33 may be elevated, and the implement turned on the wheels 1.

Having thus fully described my invention, what I claim as new, and desire to secure by Letters Patent, is:—

1. A potato digger comprising the combination of a wheeled frame, a digging member on the frame, a pair of separating wheels, means for rotating the wheels, and conveying means extending between the wheels.

2. A potato digger comprising the combination of a wheeled frame, a digging member on the frame, a pair of separating wheels having oppositely inwardly inclined faces, means for rotating the wheels, and conveying means extending between the wheels.

3. A potato digger comprising the combination of a wheeled frame, a digging member on the frame, a pair of separating wheels having oppositely inwardly inclined foraminated faces, means for rotating the wheels, and conveying means extending between the wheels.

4. A potato digger comprising the combination of a wheeled frame, a digging member on the frame, a pair of separating wheels, means for rotating the wheels in a direction opposite to the normal forward movement of the implement, and conveying means disposed between the wheels.

5. A potato digger comprising the combination of a wheeled frame, a digging member pivotally supported on the frame, means for maintaining the digging member in an elevated position, a pair of separating wheels, means for rotating the separating wheels, and conveying means disposed between the wheels.

6. A potato digger comprising the combination of a wheeled frame, a digging member pivotally supported at its rear end on the frame, a yoke disposed around the digging member and provided with screw-threaded ends, blocks suspended from the frame in which blocks are disposed the screw-threaded ends of the yoke, hand-wheels disposed on the forward ends of the yoke and arranged to bear against the blocks, means for rotating the separating wheels, and conveying means extending from the digging member to the rear part of the frame between the separating wheels.

7. A potato digger comprising a framework, a pair of stub shafts projecting outward from the framework, supporting wheels loosely mounted on the outer ends of the stub shafts, separating wheels on the inner ends of the stub shafts, means for rotating the separating wheels in a direction opposite to the supporting wheels when the implement is advanced, a digging member, and conveying means extending from the digging member between the separating wheels to the rear part of the implement.

8. In a potato digger, a separating wheel comprising a hub having a gear thereon, radiating spokes secured to and arranged at an angle to the axis of the hub, a rim secured to the spokes, and a foraminated covering on the spokes.

9. A potato digger comprising the combination of a framework, a pair of stub shafts projecting outward from the framework, supporting wheels loosely mounted on the stub shafts, separating wheels on the stub shafts provided with gears on their hubs, shafts on the framework parallel to the stub shafts, gears on the latter shafts in mesh with the gears on the hubs of the separating wheels, sprocket wheels on the latter shafts and on the stub shafts, sprocket chains connecting said wheels in pairs, a digging member carried by the frame, and conveying means extending from the digging member between the separating wheels and to the rear part of the implement.

10. A potato digger comprising the combination of a wheeled supporting framework, a pair of oppositely inclined rotatable separating members on the framework, means for rotating the separating members in a direction opposite to the forward movement of the implement, a pivotally supported digging member carried by the frame, and conveying means extending from the digging member between the separating wheels to the rear portion of the implement.

11. A potato digger comprising the combination of a wheeled supporting framework, rotatable separating members carried by the framework, means for rotating the separating members, a digging member, side members secured to the digging members and pivoted to the rear portion of the framework, cross pieces connecting the side members adjacent the digging member, longitudinal slats extending from the cross pieces to the rear ends of the side members, and a movable conveyer extending from a point adjacent the cross members to the rear portion of the frame.

12. A potato digger comprising the combination of a wheeled supporting framework, a pair of inwardly inclined rotatable separating members supported on the framework, means for rotating the members, a digging member pivotally connected to the frame adjacent its rear end and extending to its forward end, pivotally supported arms provided with fingers projecting over the digging member, conveying means extending from a point adjacent the ends of the arms to the rear portion of the frame, and means for actuating the conveying means.

13. A potato digger comprising the combination of a wheeled supporting framework, rotatable separating members carried by the framework, a pivoted digging member carried by the framework, conveying means extending from a point above the digging member between the rotatable separating members to the rear portion of the framework, a reciprocable separating grating disposed beneath the rear end of the conveying means and provided with upwardly projecting separating fingers, grills disposed on each side of the framework adjacent the lower ends of the separating grating, and means for reciprocating the separating grating and the grills.

14. A potato digger comprising the combination of a wheeled supporting frame, rotatable separating members carried by the framework, means for rotating the separating members, a digging member carried by the framework and extending upwardly toward the rear portion thereof, a transverse shaft disposed adjacent the upper end of the digging member, fingers secured on the shaft, an arm secured on the shaft, rods disposed transversely through the arm and having their opposite ends bent downward, grills disposed on the opposite sides of the framework below the lower ends of the rods, conveying means extending longitudinally of the implement from a point above the digging member to the rear part of the frame, and means coöperating with the conveying means for reciprocating the grills and the arm carrying said bent rods.

In witness whereof I have hereunto set my hand in the presence of two witnesses.

JOSEPH MOREAU.

Witnesses:
C. C. COUSINS,
E. M. SLINEY.